Patented July 29, 1952

2,605,210

UNITED STATES PATENT OFFICE 2,605,210

PRODUCTION OF RIBOFLAVIN

Richard J. Hickey, Terre Haute, Ind., assignor to Commercial Solvents Corporation, Terre Haute, Ind., a corporation of Maryland No Drawing. Application August 2, 1948, Serial No. 42,141

2 Claims. (Cl. 195—35)

The present invention relates to a process for the preparation of riboflavin. More particularly, it relates to a process for producing high yields of riboflavin by the propagation of the organism *Eremothecium ashbyii* on a nutrient medium containing casein and sodium oleate as more particularly described hereinafter.

It has been known that the organism *Eremothecium ashbyii* would synthesize riboflavin when propagated in the presence of oxygen on various solid and liquid media, including mixtures of glucose with proteins, and from waste residues from certain industrial processes such as from yeast or ethyl alcohol fermentation processes and from certain animal proteinaceous materials.

The previously disclosed processes for the production of riboflavin by fermentation have all been subject to certain disadvantages. For example, the yields of riboflavin were low, usually below 500 micrograms of riboflavin per milliliter of culture liquor, under the best conditions of operation. Still another disadvantage in the prior art processes resulted from the fact that the processes were dependent either upon expensive culture media or upon ingredients not always readily available. Although the residues from the yeast and ethyl alcohol fermentation processes are relatively inexpensive and serve as reasonably satisfactory essential ingredients of nutrient media for the production of riboflavin by fermentation thereof by the organism *Eremothecium ashbyii*, fermentation processes of such type do not operate continuously. Accordingly, riboflavin processes using such materials as an essential part of their nutrient media can operate only when the alcohol or yeast fermentation processes are operating. Other types of readily available materials suitable for the production of media capable of producing high yields of riboflavin are therefore not only desirable but essential in order to permit continuous operation with satisfactory results.

I have now discovered that by using a medium containing as essential ingredients casein and sodium oleate, much higher yields of riboflavin can be obtained in a shorter fermentation time than was possible from previously available media. The ingredients of my new fermentation medium are readily available, and hence, the operation of the riboflavin process on such media is not dependent on the operation of another process which ordinarily must be located close at hand in order to make the use of the waste fermentation or other residues therefrom practical.

In carrying out my invention, I utilize any medium containing the essential carbohydrates, mineral salts, and essential vitamins, and to it add sufficient quantities of casein and sodium oleate so as to obtain maximum yields. As the carbohydrate, I may use any metabolizable sugar, such as glucose, maltose, sucrose, etc., or mixtures containing same, such as molasses, corn syrup, and the like. As the mineral salt fraction of my medium, I use such materials as sodium chloride, potassium monohydrogen phosphate, magnesium sulfate, ferrous sulfate, potassium chloride, manganous sulfate, and the like, in the quantities customarily used in nutrient fermentation media. The vitamins customarily employed include such materials as biotin, thiamin, i-inositol, etc.

The above basic materials may, if desired, be used in connection with other materials such as the residues (commonly known as "slop") from other industrial fermentation processes such as the ethyl alcohol, butyl alcohol, yeast, etc., fermentation processes, mashes made from water and cereal grains, oil meals, and seeds from a wide variety of leguminous plants, such as peas, soybeans, field beans, and the like. Examples of other suitable materials include milk, whey, nitrogenous milk products and steep water. Also, numerous lipids when combined with the necessary amounts of proteins such as for example, gliadin or egg albumin, may be used. Examples of lipids metabolizable by the organism *Eremothecium ashbyii* include corn oil, lecithin, olive oil, peanut oil, cocoa butter, and the like. Other waste materials such as tankage, fish meal, meat scrap, treated hide scrap, trypsin, and other animal proteinaceous materials may likewise be used.

In carrying out my invention the basal aqueous medium containing carbohydrates, mineral salts and vitamins is adjusted so that it contains from 0.5 to 5.0% by weight of casein based on the weight of the culture medium and about 0.003 to 0.4%, and preferably about 0.07%, by weight of sodium oleate. Or, a material containing either of these may be satisfactorily substituted for the pure material if used in amounts which give the desired quantities of casein and sodium oleate. Also, the necessary amounts of mineral salts and vitamins may be incorporated in the medium in the form of materials containing the desired mineral salts and vitamins, such as corn steep liquor, yeast extract, and the like, instead of adding them as the pure materials. Corn steep liquor, for example, is known to contain biotin, i-inositol, thiamin and other vitamins required for the growth of microorganisms such as *Eremothecium ashbyii*. It likewise contains various salts required for growth of the organism such as potassium monohydrogen phosphate, magnesium sulphate, etc. When therefore, materials such as corn steep liquor are available, it is possible to prepare my new media by merely mixing with water the desired carbohydrate or mixture thereof, corn steep liquor, casein, and sodium oleate.

In carrying out my invention I have found that a medium of the type shown below gives excellent yields. It will be noted that these formulae both contain a mixture of carbohydrates, namely cerelose and maltose, since it has been found that such a mixture gives better yields than either used alone.

| | |
|---|---|
| Casein | 0.5 to 5.0 per cent by weight |
| Sodium oleate | 0.003 to 0.4 per cent by weight |
| $K_2HPO_4$ | 0.10 to 0.20 per cent by weight |
| $MgSO_4.7H_2O$ | 0.05 to 0.20 per cent by weight |
| Cerelose | 0.5 to 2.0 per cent by weight |
| Maltose | 0.1 to 1.5 per cent by weight |
| i-Inositol | 0.67 to 3.0 mg. per cent by weight |
| Thiamin | 0.01 to 0.15 mg. per cent by weight |
| Biotin | 0.034 to 0.07 μg. per cent by weight |

As previously indicated the individual salts and vitamins used in the formula set forth above may be omitted when using such materials as corn steep liquor which contains adequate quantities of both salts and vitamins. The following formula illustrates a medium of this type:

| | |
|---|---|
| Casein | 0.5 to 5.0 per cent by weight |
| Cerelose | 0.5 to 2.0 per cent by weight |
| Maltose | 0.1 to 1.5 per cent by weight |
| Sodium oleate | 0.003 to 0.4 per cent by weight |
| Corn steep liquor | 0.1 to 0.7 per cent by volume |

The maltose used in both of the above formulas may be added in the form of the pure sugar or in the form of malt extract or a malted grain. The latter is ordinarily the most economical and practical form of incorporating the maltose.

My new fermentation medium, before the addition of the casein and sodium oleate, is prepared according to any of the known methods. For example, the maltose may be prepared by methods well known to the art such as, for example, in brief, by adding a small amount of barley malt to cold water. The mixture is then premalted and gelatinized by heating to about 15 pounds pressure for one hour, cooling and adding sufficient water to bring the mixture to 145° F. A cold slurry of barley malt is then added to the mixture and the latter allowed to malt for about 30 minutes. The pH should, if necessary, be adjusted to about 6.4 and cold water added to give the desired volume. The desired quantity of corn steep liquor and sodium oleate is then added to cold water and the pH adjusted to about 6.4. The desired amount of casein and cerelose or sucrose is next added. This slurry is then added to the maltose prepared as previously described, and the resulting mixture heated in a pressure cooker for about 90 minutes at 235° F. After sterilization, the medium is inoculated with an active culture of the organism *Eremothecium ashbyii*, and allowed to ferment at a temperature of 24°–32° C. in shallow pans, or in tanks aerated by introducing air into the medium through a sparger tube or other suitable device. Substantial quantities of riboflavin are ordinarily produced in as little as 3 days, but maximum riboflavin yields are usually reached after about 4 to 5 days of fermentation under suitable conditions of temperature and aeration. At the conclusion of the fermentation the riboflavin may be recovered by known processes, such as by precipitating and recrystallizing the pure riboflavin, or by drying the entire fermented mash for use as an animal feed supplement, or the like.

The following specific examples will further illustrate my invention:

EXAMPLE I

A medium was prepared by adding to water 2.0% casein, 0.07% sodium oleate, 0.2% $K_2HPO_4$, 0.07% $MgSO_4.7H_2O$, 1.5% cerelose, 1.0% maltose, 3.0 mg. per cent i-inositol, 0.15 mg. per cent thiamin and 0.06 μg. per cent biotin. About 150 ml. of the resulting mixture, having a pH of 6.4, was placed in one liter flasks, sterilized, and then inoculated by adding to each flask 1.0 to 1.5 milliliters of a four day old culture of *Eremothecium ashbyii*. Cotton stoppers were placed in each flask. The flasks were then incubated at a temperature of 28° C. while aerating by shaking the flasks in the presence of air to supply oxygen to the organisms. After fermentation for three to five days under the conditions described, riboflavin yields given in the table below were obtained. These results show that yields of riboflavin well above 1000 μg./ml. are obtainable using a medium with the composition given above.

*Table I*

| Flask | 3 days Ribo. μg./ml. | 5 days Ribo. μg./ml. |
|---|---|---|
| 1 | 1,190 | 1,410 |
| 2 | 1,130 | 1,400 |
| 3 | 965 | 1,400 |
| 4 | 1,070 | 1,430 |

EXAMPLE II

A fermentation medium was prepared as described in Example I, the medium having the same composition as that of Example I, except that the necessary amounts of biotin, thiamin, $MgSO_4.7H_2O$, i-inositol and $K_2HPO_4$ were supplied in the form of 0.5% of corn steep liquor. The medium was sterilized, inoculated and the fermentation carried out under conditions similar to those described in Example I. The results, set out in the table below, show that satisfactory yields can be obtained by the substitution of the relatively low priced corn steep liquor for the higher priced pure vitamins and minerals necessary for the production of riboflavin by *Ereomothecium ashbyii*.

*Table II*

| 3 days Ribo. μg./ml. | 5 days Ribo. μg./ml. |
|---|---|
| 925 | 1,360 |

EXAMPLE III

A series of fermentation media was prepared in one liter flasks, each medium containing 2.0% casein, 0.5% corn steep liquor, 1.5% cerelose and 1.0% maltose. In one group of the flasks, the basal medium described above was sterilized and inoculated with an active culture of *Eremothecium ashbyii*. To another group of flasks, 0.06% sodium oleate was added before the sterilization and inoculation. The fermentation of the media in these two groups of flasks was carried out under conditions similar to those described in Example I. The results, given in the table below, show that large increases in the yields of riboflavin are obtained by adding sodium oleate to the medium. Each figure shown is an average of several runs.

*Table III*

| Group | Medium | 3 Days Average Ribo. µg./ml. | 4 Days Average Ribo. µg./ml. | 5 Days Average Ribo. µg./ml. |
|---|---|---|---|---|
| 1 | Basal alone | 490 | 700 | 920 |
| 2 | Basal+0.06% Na oleate | 1,070 | 1,360 | 1,370 |

EXAMPLE IV

A series of fermentations was run, using a basal medium containing 0.5% corn steep liquor, 0.07% sodium oleate, 1.5% glucose and 1.0% maltose, prepared in a one liter flask as described in Example I. In certain of the flasks, the basal medium was supplemented by the addition of different quantities of casein, as indicated in the table below. The contents of each flask were sterilized, inoculated with *Eremothecium ashbyii* and the fermentation was carried out under conditions similar to those described in Example I. These tests show that increased yields of riboflavin are obtained by increasing the quantity of casein up to about 2.5% casein. Each figure shown is an average of several runs.

*Table IV*

| Medium | 3 Days Average Ribo. µg./ml. |
|---|---|
| Basal only | 50 |
| Basal+0.2% casein | 470 |
| Basal+0.5% casein | 860 |
| Basal+1.0% casein | 990 |
| Basal+2.0% casein | 1,150 |
| Basal+2.5% casein | 1,210 |
| Basal+3.0% casein | 1,130 |

While the above examples describe the preferred embodiments of my invention, it will be understood that departures therefrom may be made within the scope of the specification and claims. In general it may be said that any modifications or equivalents that would ordinarily occur to those skilled in the art are to be considered as lying within the scope of my invention.

In accordance with the foregoing specification, I claim as my invention:

1. A process for preparing riboflavin which comprises inoculating with an active culture of the organism *Eremothecium ashbyii* a nutrient medium containing from 0.5 to 5.0% casein, 0.10 to 0.20% $K_2HPO_4$, from 0.05 to 0.20% $MgSO_4.7H_2O$, from 0.5 to 2.0% glucose, from 0.1 to 1.5% maltose, from 0.67 to 3.0 mg. per cent i-inositol, from 0.01 to 0.15 mg. per cent thiamin, from 0.034 to 0.07 µg. per cent biotin and from 0.003 to 0.4% sodium oleate, and maintaining said inoculated medium at temperatures favorable to the growth of said organism while supplying oxygen thereto.

2. A process for preparing riboflavin which comprises inoculating with an active culture of the organism *Eremothecium ashbyii* a nutrient medium containing from 0.5 to 5% casein, from 0.5 to 2.0% cerelose, from 0.1 to 1.5% maltose, from 0.003 to 0.4% sodium oleate and 0.1 to 0.7% corn steep liquor, and maintaining said inoculated medium at temperatures between 24 and 32° C. while supplying oxygen thereto.

RICHARD J. HICKEY.

REFERENCES CITED

The following references are of record in the file of this patent:

UNITED STATES PATENTS

| Number | Name | Date |
|---|---|---|
| 2,374,503 | Rudert | Apr. 24, 1945 |
| 2,442,141 | Moyer | May 25, 1948 |
| 2,473,818 | Phelps | June 21, 1949 |
| 2,483,855 | Stiles | Oct. 4, 1949 |

OTHER REFERENCES

Whitmore, Organic Chemistry, 3rd ed., 1937, D. Van Nostrand Co., Inc., page 319.

Schopfer, Helvetica Chimica Acta V, XXVII, Aug. 1, 1944, pages 1017 to 1031.